US010327176B2

United States Patent
Ercan et al.

(10) Patent No.: US 10,327,176 B2
(45) Date of Patent: Jun. 18, 2019

(54) SYSTEM AND METHOD FOR PROGRAMMABLE VIRTUALIZATION AND LOAD BALANCING OF SPLIT- CHANNEL HETEROGENEOUS NETWORKS UTILIZING DUAL CONNECTIVITY

(71) Applicant: NETSIA, INC., Sunnyvale, CA (US)

(72) Inventors: Ali Ozer Ercan, San Jose, CA (US); Mehmet Oguz Sunay, San Francisco, CA (US)

(73) Assignee: NETSIA, INC., Sunnyvale, CA (US)

( * ) Notice: Subject to any disclaimer, the term of this patent is extended or adjusted under 35 U.S.C. 154(b) by 0 days.

(21) Appl. No.: 15/847,508

(22) Filed: Dec. 19, 2017

(65) Prior Publication Data

US 2018/0176825 A1    Jun. 21, 2018

Related U.S. Application Data

(60) Provisional application No. 62/436,400, filed on Dec. 19, 2016.

(51) Int. Cl.
*H04W 28/08*    (2009.01)
*H04W 76/15*    (2018.01)
(Continued)

(52) U.S. Cl.
CPC .......... *H04W 28/08* (2013.01); *H04W 76/15* (2018.02); *H04W 84/045* (2013.01); *H04W 88/18* (2013.01); *H04W 92/20* (2013.01)

(58) Field of Classification Search
CPC ... H04W 28/08; H04W 84/045; H04W 36/22; H04W 76/15; H04W 36/28; H04W 28/10
See application file for complete search history.

(56) References Cited

U.S. PATENT DOCUMENTS

2014/0335869 A1* 11/2014 Choi ................. H04W 36/0072
455/438
2015/0296499 A1* 10/2015 Huang ................ H04W 72/048
370/329

(Continued)

FOREIGN PATENT DOCUMENTS

| WO | 2015159879 | 10/2015 |
| WO | 2016006679 | 1/2016 |
| WO | 2016021662 | 2/2016 |

OTHER PUBLICATIONS

H. Wang et al., "Dual connectivity for LTE-advanced heterogeneous networks," Wireless Networks, 22(4), Aug. 7, 2015, pp. 1315-1328.

(Continued)

*Primary Examiner* — Dung Hong
(74) *Attorney, Agent, or Firm* — IP Authority, LLC; Ramraj Soundararajan

(57) ABSTRACT

Any one of the following dual connectivity attributes is assigned to a group profile of each service group: (1) macro cell only (serving both data/control planes via a macro cell base station.), (2) small cell only (serving data/control planes via a small cell base station), (3) dual connectivity enabled-A (serving data plane of UEs via a small cell base station, and serving control plane via a macro cell base station), and (4) dual connectivity enabled-B (serving data plane via both a macro cell base station and a small cell base station, and serving control plane via a macro cell base station), wherein the RAN controller calculates and sets the optimal splitting between the macro cell base station and the small cell base station dynamically, such that desired load balancing is achieved.

20 Claims, 7 Drawing Sheets

(51) Int. Cl.
*H04W 84/04* (2009.01)
*H04W 88/18* (2009.01)
*H04W 92/20* (2009.01)

(56) References Cited

U.S. PATENT DOCUMENTS

| | | | |
|---|---|---|---|
| 2015/0334737 A1 | 11/2015 | Susitaival et al. | |
| 2015/0341977 A1 | 11/2015 | Fukuta et al. | |
| 2015/0365984 A1* | 12/2015 | Lee | H04W 72/0426 370/329 |
| 2016/0037560 A1* | 2/2016 | Liu | H04L 51/34 370/329 |
| 2016/0050706 A1 | 2/2016 | Zhang et al. | |
| 2016/0105877 A1 | 4/2016 | Yi et al. | |
| 2016/0112164 A1 | 4/2016 | Worrall | |
| 2016/0113058 A1 | 4/2016 | Jung et al. | |
| 2016/0119826 A1 | 4/2016 | Huh et al. | |
| 2016/0119856 A1* | 4/2016 | Hwang | H04W 48/08 370/328 |
| 2016/0255632 A1* | 9/2016 | Forssell | H04W 76/15 370/329 |
| 2016/0330693 A1* | 11/2016 | Hwang | H04W 52/146 |
| 2018/0007584 A1* | 1/2018 | Kwon | H04W 28/08 |
| 2018/0242209 A1* | 8/2018 | Xu | H04W 36/00 |
| 2018/0242301 A1* | 8/2018 | Hwang | H04L 1/1861 |

OTHER PUBLICATIONS

CATT, "RRM related issues of Dual Connectivity technique," 3GPP TSG RAN WG2 Meeting #81 bis, Chicago, IL, USA, Apr. 15-Apr. 19, 2013, 4pgs.

H. Ishii et al., "A novel architecture for LTE-B: C-plane/U-plane Split and Phantom Cell Concept," IEEE Globecom Workshops 2012, Dec. 3, 2012, pp. 624-630.

"LTE; Scenarios and requirements for small cell enhancements for E-UTRA and E-UTRAN (3GPP TR.36.932 version 12.1.0 Release 12," Oct. 2014, V12.1.0, 16pgs.

Roessler et al., "LTE-Advanced (3GPP Rel. 12) Technology Introduction White Paper," 60pgs.

* cited by examiner

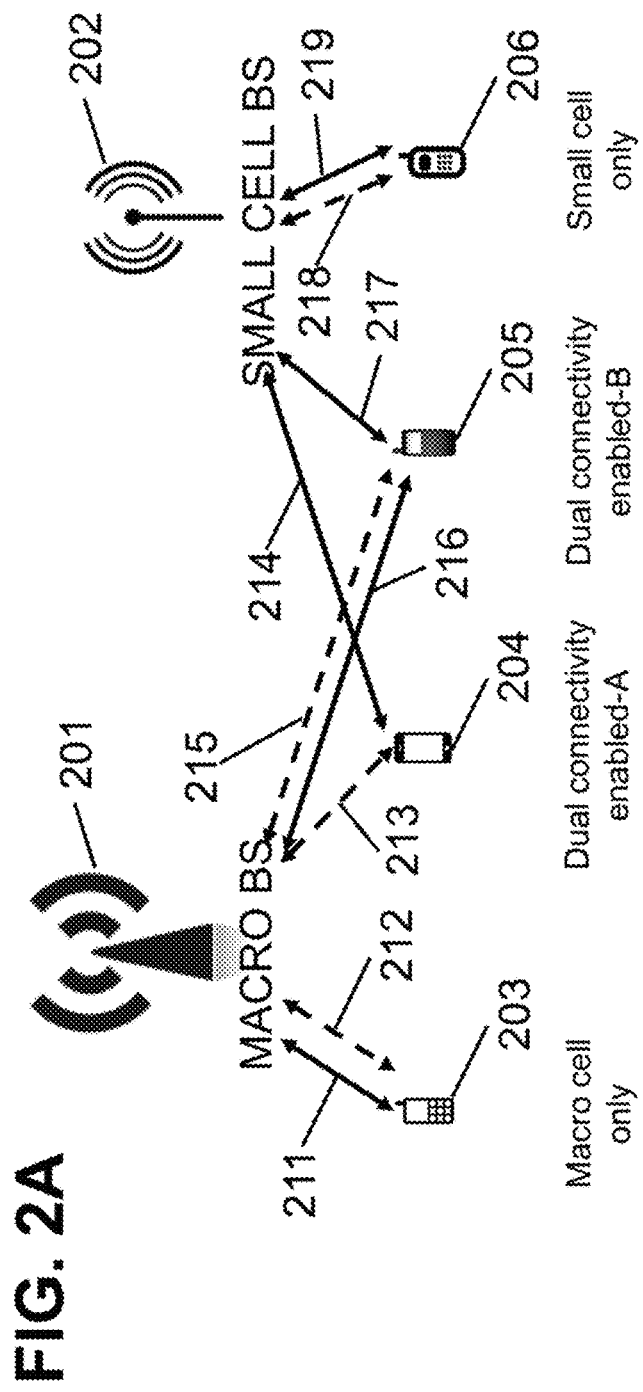

SYSTEM AND METHOD FOR PROGRAMMABLE VIRTUALIZATION AND LOAD BALANCING OF SPLIT- CHANNEL HETEROGENEOUS NETWORKS UTILIZING DUAL CONNECTIVITY

RELATED APPLICATION

This application claims the benefit of provisional application 62/436,400 filed Dec. 19, 2016.

BACKGROUND OF THE INVENTION

Field of Invention

The present application pertains to service group based virtualization and load balancing of radio access networks where macro and small cells coexist and collaborate to enhance network capacity.

Discussion of Related Art

A number of related art is present. The patent application US 2015/0341977 A1 discloses a dual connectivity architecture where a heterogeneous network (HetNet) consisting of a macro cell and small cells that have completely overlapping coverage areas with the macro cell, serve at two distinct frequency bands. To avoid handover failures due to multiple possible handovers as a user equipment (UE) traverses through the coverage area boundaries of the small cells, the UE is proposed to remain connected to the macro cell base station (BS) while connecting to the small cell BS whenever the UE is in the coverage area of the said small cell in order to increase throughput. The control and user planes are not separated between macro and small cell in this application.

The patent application US 2016/0112164 A1 discloses methods and programs for a network node to use a secondary cell for dual connectivity. The UE identifies a random access channel (RACH) in the secondary cell for dual connectivity use. The patent discloses methods such as using a dedicated RACH preamble to avoid the contention. Control/user plane separation, as well as separation in other dimensions such as the downlink/uplink separation are listed as possible scenarios.

The patent application US 2016/0105877 A1 specifies a method and device for allocating uplink resources in a wireless communication system utilizing dual connectivity. The first eNB receives buffer size information from the UE and the first eNB informs the second eNB about the uplink resource allocation. The control and data planes are not separated between the eNBs.

In a wireless communication system utilizing dual connectivity, the patent application US 2016/0119826 A1 specifies a method and a device for re-transmitting the lost packets by the macro base station due to the release of small cell connectivity. The patent application US 2016/0113058 A1 specifies a method for a UE to receive multi flow data with respect to an EPS bearer in a dual connectivity wireless communication system. The separation of data and control planes are not considered in these applications.

Patent application WO 2015/159879 A1 discloses a device and method for splitting the uplink data between the base stations in a wireless communication system using dual connectivity. The link qualities between the UE and the base stations and the base station loads are used in the computation of the splitting ratio.

Patent application WO 2016/021662 A1 specifies a technology in a wireless communication system utilizing dual connectivity, to re-establish the RLC layers for the master and secondary base stations and to re-establish the PDCP layer when the uplink transmission direction of a split bearer changes.

Patent application US 2015/0334737 A1 discloses a method to manage and multiplex the uplink data transmissions of a wireless terminal that is connected to two base stations under the dual connectivity technology. The patent application WO 2016/006679 A1 specifies a method to suppress a decline in uplink throughput in a wireless communication system that utilizes dual connectivity, by controlling the transmission powers to each base station.

Embodiments of the present invention are an improvement over prior art systems and methods.

SUMMARY OF THE INVENTION

In one embodiment, the present invention provides a method for programmable virtualization and load balancing of split-channel heterogeneous networks utilizing a dual connectivity paradigm comprising: (a) assigning a dual connectivity attribute to a group profile of each service group, the dual connectivity attribute comprising any of the following: macro cell only, small cell only, dual connectivity enabled-A, and dual connectivity enabled-B; (b) serving both a data plane and a control plane of one or more user equipment belonging to a service group having the macro cell only attribute via a macro cell base station; (c) serving both a data plane and a control plane of one or more user equipment belonging to a service group having the small cell only attribute via a small cell base station; (d) serving data plane of one or more user equipment belonging to a service group having the dual connectivity enabled-A attribute via a small cell base station, and serving control plane of one or more user equipment belonging to the service group having the dual connectivity enabled-A attribute via a macro cell base station; and (e) serving data plane of one or more user equipment belonging to a service group having the dual connectivity enabled-B attribute via both a macro cell base station and a small cell base station, and serving control plane of one or more user equipment belonging to the service group having the dual connectivity enabled-B attribute via a macro cell base station, and wherein splitting of data between macro cell base stations and small cell base stations, and allocation of one or more wireless resources is governed by a Radio Access Network (RAN) controller, the RAN controller calculating and dynamically setting splitting of data between macro cell base stations and small cell base stations in order to achieve a desired load balancing, and wherein the macro cell base stations utilizes a common frequency band that is non-overlapping with at least another frequency band which is shared by the small cell base stations.

In another embodiment, the present invention provides an article of manufacture comprising non-transitory computer storage medium storing computer readable program code which, when executed by a processor implements a method for programmable virtualization and load balancing of split-channel heterogeneous networks utilizing a dual connectivity paradigm, the computer storage medium comprising: (a) computer readable program code assigning a dual connectivity attribute to a group profile of each service group, the dual connectivity attribute comprising any of the following: macro cell only, small cell only, dual connectivity enabled-A, and dual connectivity enabled-B; (b) computer readable program code serving both a data plane and a control plane of one or more user equipment belonging to a service group having the macro cell only attribute via a macro cell base station; (c) computer readable program code serving both a data plane and a control plane of one or more user equipment belonging to a service group having the small cell only attribute via a small cell base station; (d) computer readable program code serving data plane of one or more user equipment belonging to a service group having the dual connectivity enabled-A attribute via a small cell base station, and serving control plane of one or more user equipment belonging to the service group having the dual connectivity enabled-A attribute via a macro cell base station; and (e) computer readable program code serving data plane of one or more user equipment belonging to a service group having the dual connectivity enabled-B attribute via both a macro cell base station and a small cell base station, and serving control plane of one or more user equipment belonging to the service group having the dual connectivity enabled-B attribute via a macro cell base station, and wherein splitting of data between macro cell base stations and small cell base stations, and allocation of one or more wireless resources is governed by a Radio Access Network (RAN) controller, the RAN controller calculating and dynamically setting splitting of data between macro cell base stations and small cell base stations in order to achieve a desired load balancing, and wherein the macro cell base stations utilizes a common frequency band that is non-overlapping with at least another frequency band which is shared by the small cell base stations.

In an extended embodiment, the wireless resources comprise any of, or a combination of, the following: time, frequency, transmission power, code, or antenna. In an extended embodiment, the wireless resources that are allocated to traffic associated with the macro cell only attribute traffic are collectively $x_1$% of total macro cell base station resources, wireless resources that are allocated to traffic associated with the dual connectivity enabled-A attribute are collectively $x_2$% of total small cell base station resources, wireless resources that are allocated to traffic associated with the dual connectivity enabled-B attribute are collectively $x_3$% of the total small cell base station resources, and wireless resources that are allocated to traffic associated with the small cell only attribute are collectively $x_4$% of the total small cell base station resources, wherein the sum of $x_2$, $x_3$, and $x_4$ is less than or equal to 100.

When a fraction $c_a$ of a collective traffic associated with the dual connectivity enabled-A attribute is control traffic and another fraction $(1-c_a)$ of the collective traffic associated with the dual connectivity enabled-A attribute is data traffic, and when a fraction $c_b$ of a collective traffic associated with the dual connectivity enabled-B attribute is control traffic and another fraction $(1-c_b)$ of the collective traffic associated with the dual connectivity enabled-B attribute is data traffic, wherein $c_a$ and $c_b$ are non-negative real numbers that are less than or equal to one, and where a fraction p is defined as a collective traffic destined to dual connectivity enabled-B UEs that are to be served by a macro cell BS, the method further comprises the steps of: (a) computing utilization of a given macro cell base station as y % of its resources, where y is given by: $y=x_1+c_ax_2+c_bx_3+(1-c_b)px_3$, and (b) computing utilization of a given small cell base station as z % of its resources, where z is given by: $z=x_4+(1-c_a)x_2+(1-c_b)(1-p)x_3$.

In an extended embodiment, in order to achieve the desired load balancing between macro cells and small cells, the RAN controller sets p to a desired level according to:

$$p = \begin{cases} 0, & \text{if } y_{max} < \alpha_1, \\ \dfrac{y_{max} - x_1 - c_ax_2 - c_bx_3}{(1-c_b)x_3}, & \text{if } \alpha_1 \le y_{max} \le \beta_1, \\ 1, & y_{max} > \beta_1, \end{cases}$$

wherein $y_{max}$ is a target maximum macro cell resource usage level, $\alpha_1=x_1+c_ax_2+c_bx_3$ and $\beta_1=x_1+c_ax_2+c_bx_3+(1-c_b)x_3$.

In an extended embodiment, in order to achieve the desired load balancing between macro cells and small cells, the RAN controller sets p to a desired level according to:

$$p = \begin{cases} 1, & \text{if } z_{max} < \alpha_2, \\ 1 - \dfrac{z_{max} - x_4 - (1-c_a)x_2}{(1-c_b)x_3}, & \text{if } \alpha_2 \le z_{max} \le \beta_2, \\ 0, & y_{max} > \beta_2, \end{cases}$$

wherein $z_{max}$ is a target maximum macro cell resource usage level, $\alpha_2=x_4+(1-c_a)x_2$ and $\beta_2=x_4+(1-c_a)x_2+c_bx_3+(1-c_b)x_3$.

In an extended embodiment, in order to achieve the desired load balancing between macro cells and small cells, the RAN controller sets p to a desired level according to:

$$p = \begin{cases} 0, & \text{if } \rho < 0, \\ \rho, & \text{if } 0 \le \rho \le 1, \\ 1, & \rho > 1, \end{cases} \text{ wherein}$$

$$\rho = \frac{\gamma x_4 - x_1 + (\gamma - \gamma c_a - c_a)x_2 + (\gamma - \gamma c_b - c_b)x_3}{(1+\gamma)(1-c_b)x_3}.$$

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

A demultiplexer entity between the core network and the base stations forwards the data packets from the core network to the correct base station. The control communication between the RAN controller and the base stations are direct, and can be realized by the S1-MME interface or by a newly defined interface in the LTE architecture, or any other equivalent interfaces in other current or future technologies.

Figure 1A:
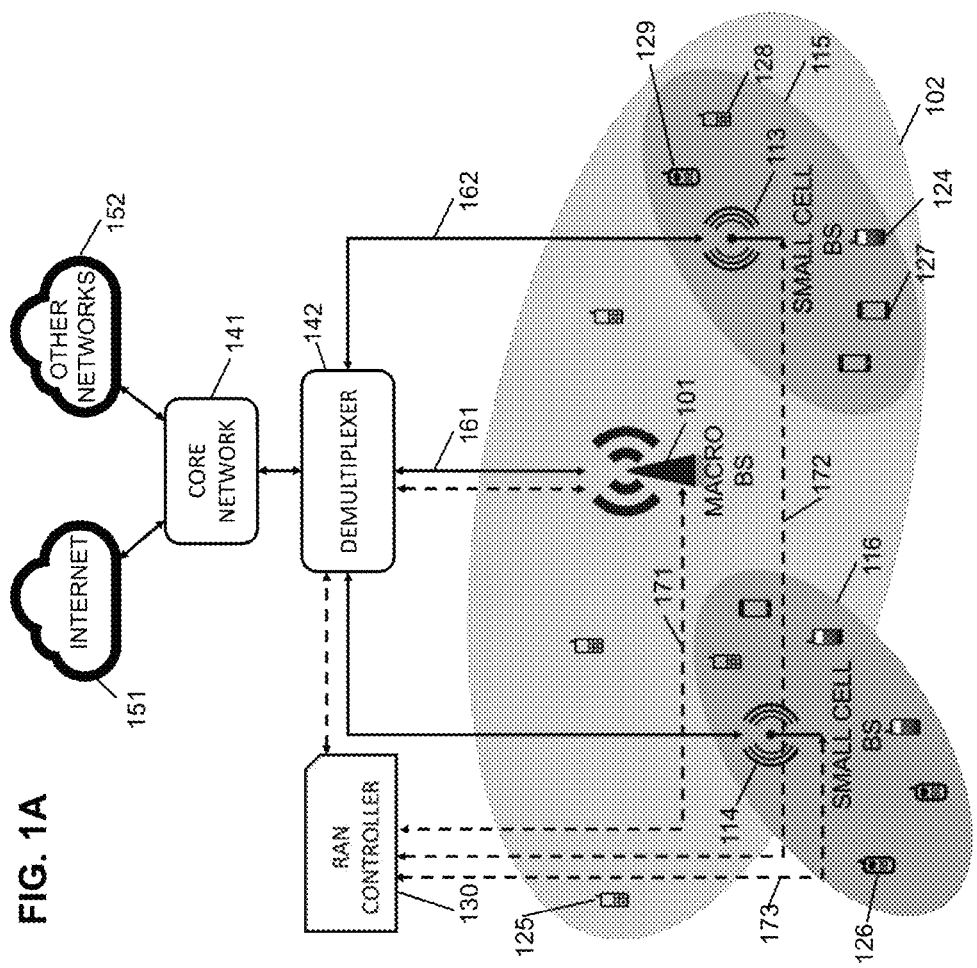
FIG. 1A depicts the architecture assumed by the invention. Plurality of user equipments (UEs) are served by a macro cell base station (BS) and/or small cell base stations with partially or completely overlapping service areas with the macro BS. The UEs may belong to different service groups. A RAN controller that is concerned with the control plane of the radio access network performs the wireless resource allocation and load balancing among the base stations. A service group attribute designates a service group to be "macro cell only," "small cell only," "dual connectivity enabled-A" or "dual connectivity enabled-B." The "macro cell only" service group is served by the macro cell base station. The "small cell only" service group is served by the small cell base stations. The "dual connectivity enabled-A" service group's control plane is served by macro cell base station and its data plane is served by the small cell base stations. The "dual connectivity enabled-B" service group's control plane is served by macro cell base station and its data plane is served by both macro and small cell base stations.
Figure 1B:
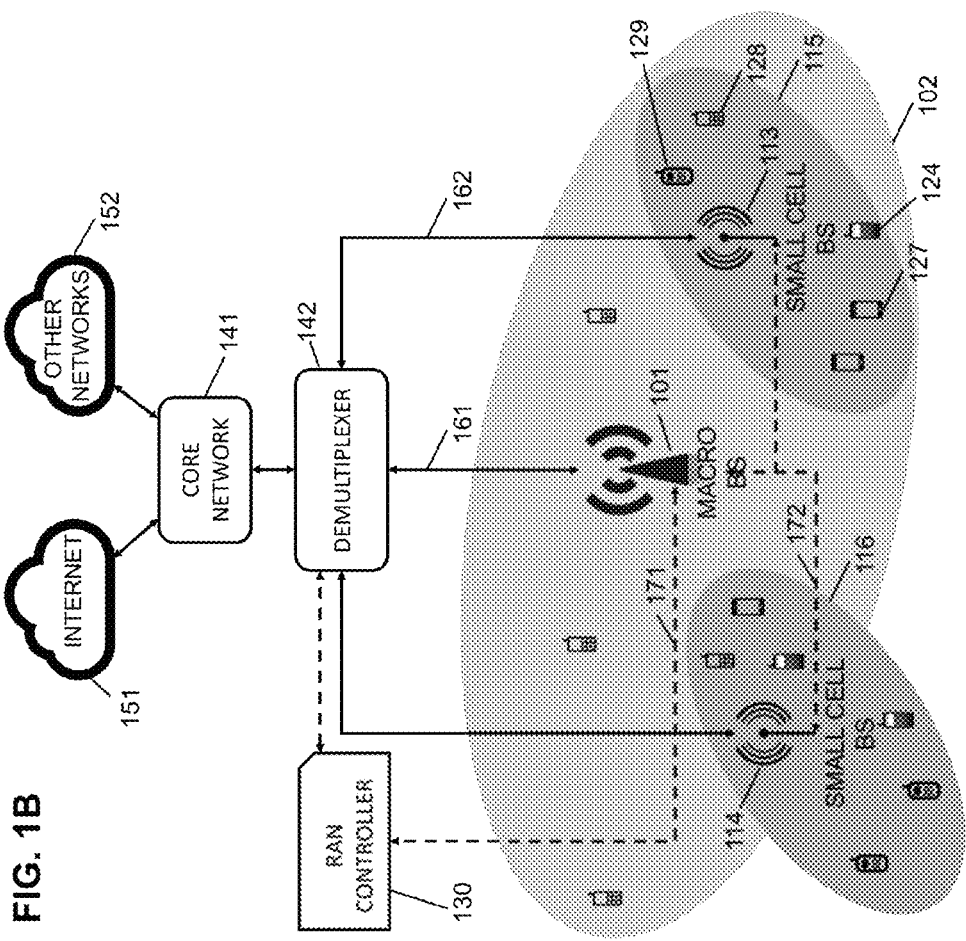

FIG. 1B depicts another embodiment where the control communications between the RAN controller and small cell base stations are via the macro cell base station. The macro cell BS to small cell BS control communication can be realized by the X2-C interface or by a newly defined interface in the LTE architecture, or any other equivalent interfaces in other current or future technologies.

Figure 1C:
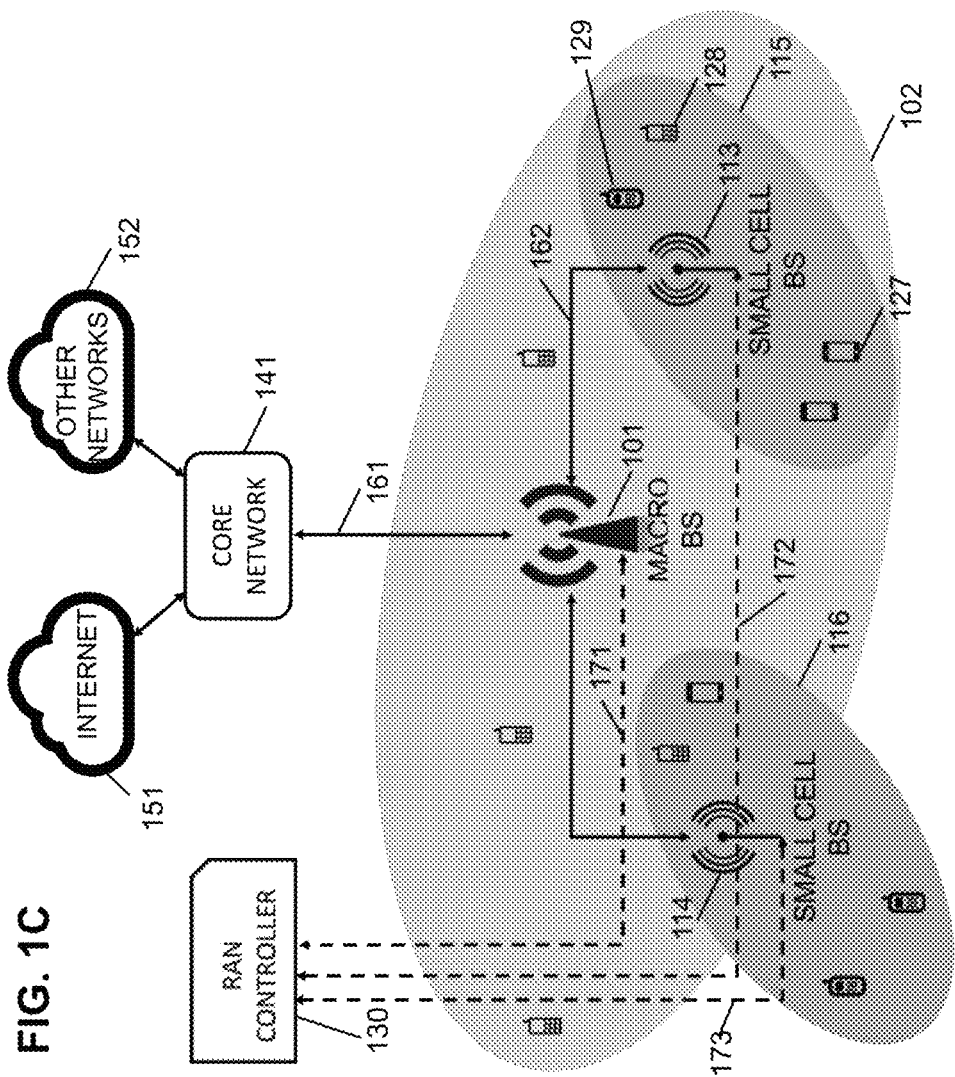

FIG. 1C shows another embodiment where the data communications between the core network and the small cell base stations are done through the macro cell base station. The macro cell BS to small cell BS data communication can be realized by the X2-U interface or by a newly defined interface in the LTE architecture, or any other equivalent interfaces in other current or future technologies.

Figure 1D:
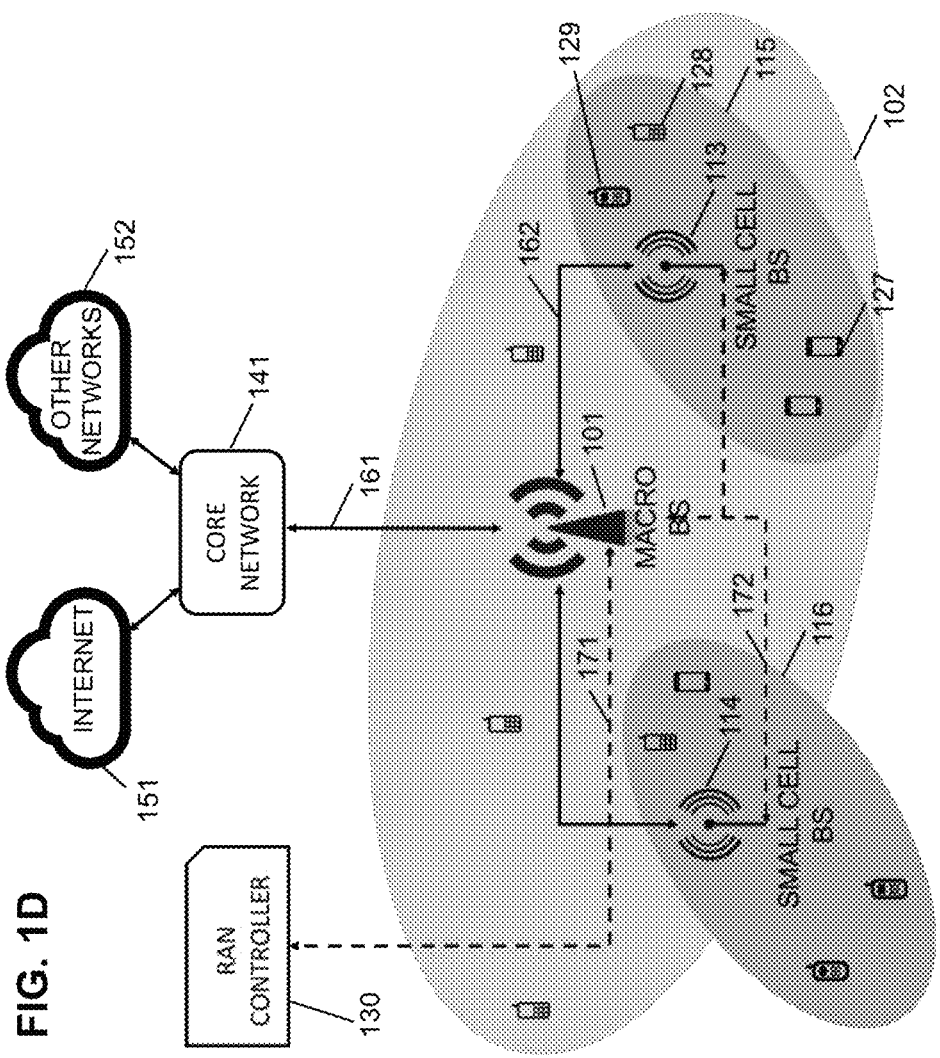

FIG. 1D shows another embodiment where both the data and control communications to small cell base stations are done through the macro cell base station.

Figure 2B:
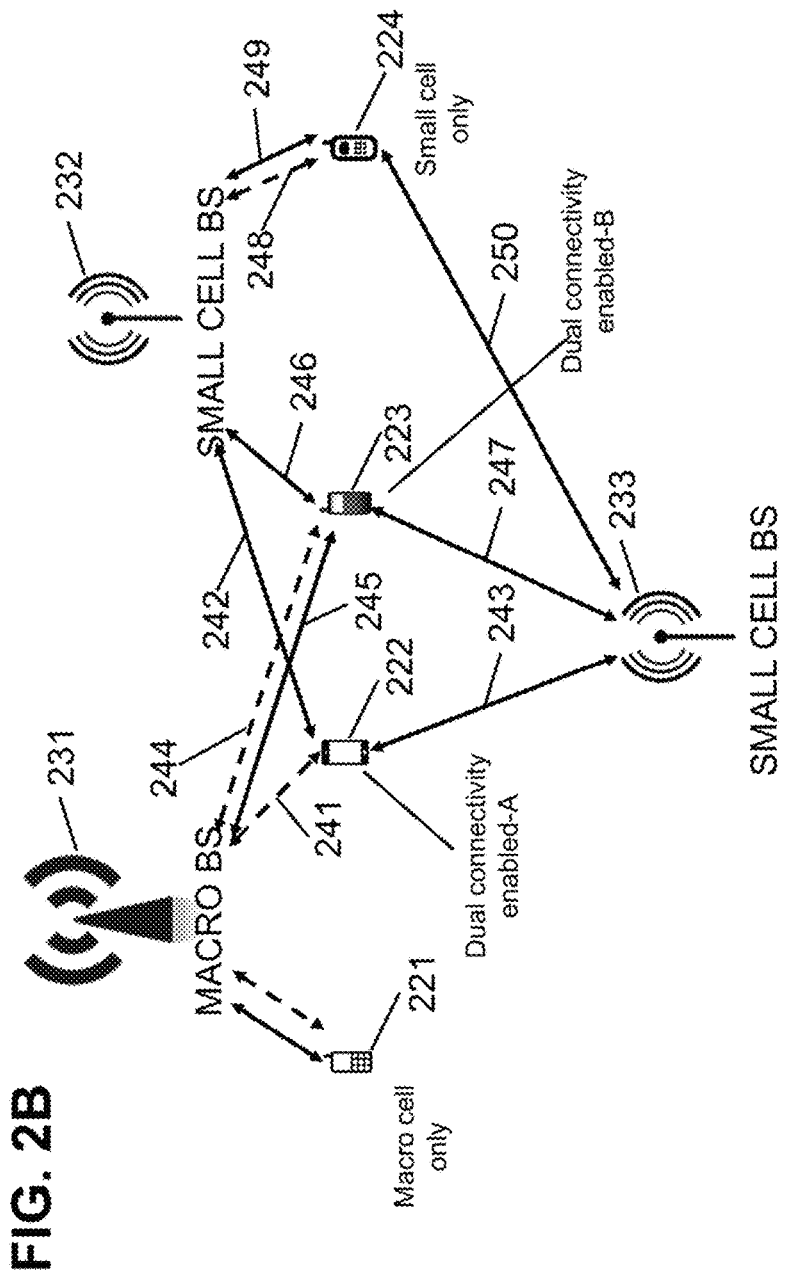

FIG. 2A depicts the data and control communications between the base stations and the UEs. While the control communications of "macro cell only" or dual connectivity enabled UEs are served by the macro cell (as shown by the dashed lines), depending on the dual connectivity attribute of a service group, the data traffic of the UEs belonging to said service group may be served by the macro cell BS, small cell BS, or both (as shown by the solid lines). The RAN controller performs load balancing between the macro cell base station and the small cell base stations by splitting the data traffic of "dual connectivity enabled-B" UEs in an optimal manner. FIG. 2B shows another embodiment where some service groups' data may be served by more than one small cell. In this case, further load balancing among the small cells can be performed.

Figure 3:
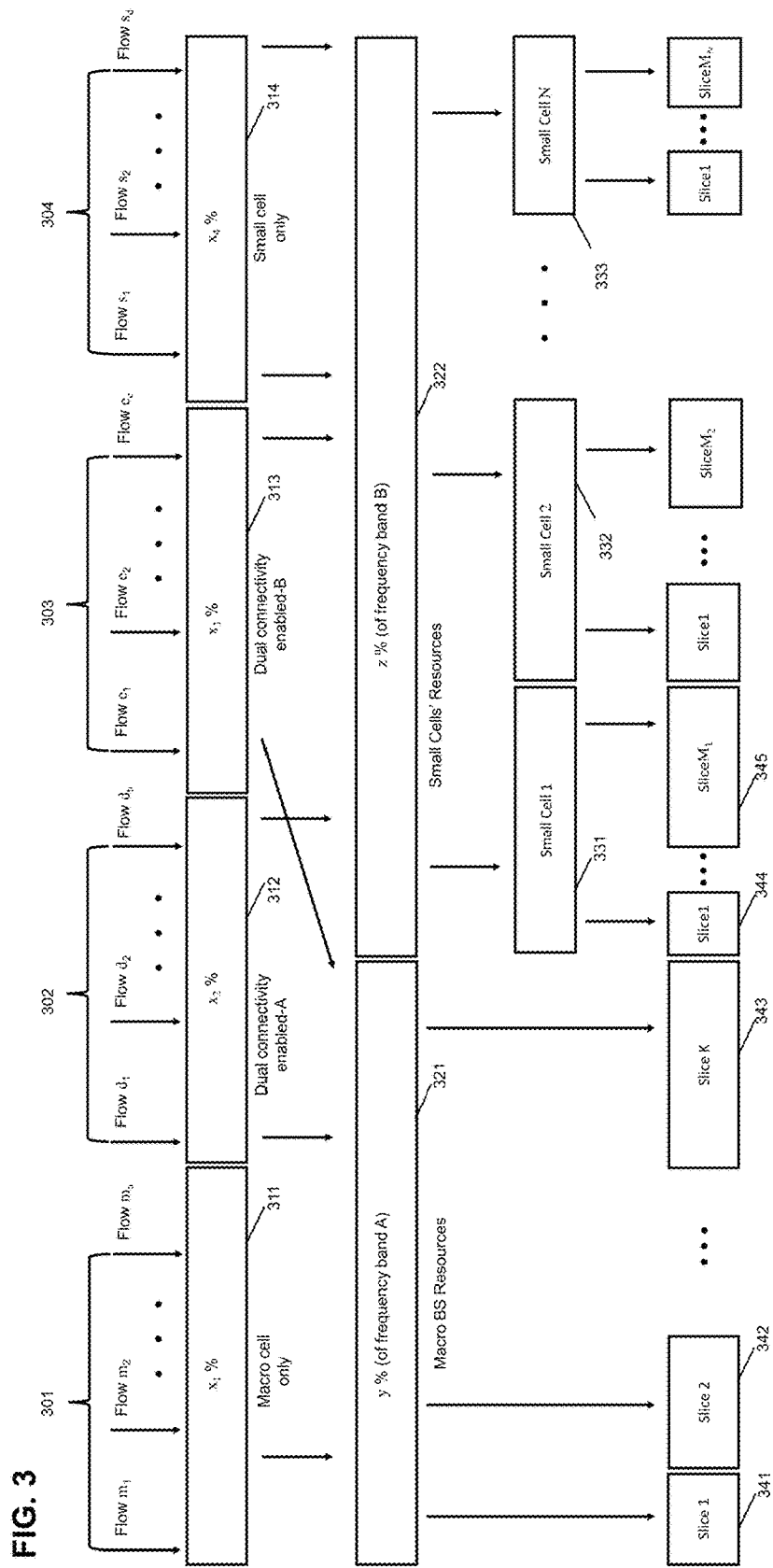

FIG. 3 shows the methods of allocation of wireless resources to macro and small cell base stations that achieve a desired load balancing in the presence of service groups that are "dual connectivity enabled."

DESCRIPTION OF THE PREFERRED EMBODIMENTS

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

Monthly mobile data demand has grown to exceed several exabytes already. To meet such an explosive demand, starting with 3GPP Release 10, network densification via small cells has been an important direction to significantly increase network capacity. Said benefits of heterogeneous networks (HetNets) that consist of macro and small cells are only realizable after overcoming some technical hurdles. Towards this goal, in 2012, 3GPP has released the technical report TR 36.932 studying the deployment scenarios and technical requirements for small cell enhancements for E-UTRA and E-UTRAN.

Although capacity improvements due to small cell installments have mostly benefited indoor or low mobility cases, there has not been a practical solution for outdoor and/or high mobility environments. To achieve such benefits, one important technological hurdle is the achievement of practical handover procedures. At high mobility, since there may be many small cell coverage areas that can be traversed within small periods of time, the overhead of required signaling for cell reselections may significantly reduce the benefits of small cells. Moreover, the asymmetry of transmit powers of macro and small cell base stations can degrade the performance of handover algorithms, increase handover failures, cause Ping-Pong effect, etc.

With 3GPP Release 12, new HetNet architectures that tackle the problems outlined above have been proposed. Two prominent examples to such proposals are the "Phantom Cell," and "Dual Connectivity" architectures proposed for LTE standard. Both proposals have very similar aspects. The most important property of both proposals is the separation of the control plane and the user plane (data plane), such that the control plane is solely served by the macro cell base station, where as the user plane may be served by either the small cell or the macro cell base stations. The small cells are not conventional cells as they do not carry any cell specific signals such as the PSS, SSS, CRS, MIB, SIB, etc., that exist in the LTE standard. The radio resource control operations such as channel establishment and release are managed by the macro cell. As such, the signaling overhead of high mobility handovers are significantly reduced.

Another important direction to increase flexibility and efficiency is virtualization of wireless resources for a wireless system where multiple virtual MAC layer slices may operate simultaneously in a base station. Under this paradigm, users or flows of users sharing wireless resources are grouped together so that each group may be subjected to its own set of medium access (MAC) protocols. The network operator or service provider that serves a plurality of subscribers defines a service group for said plurality of subscribers and controls the corresponding virtualized MAC for the said service group. The grouping of users or flows of users into service groups may be in one or more of the following ways:

In an environment where one mobile network operator (MNO) and one or more mobile virtual network operators (MVNOs) utilize the same spectrum, users may be grouped according to their network operator subscriptions, Users may be grouped according to their service subscription profiles, Users may be grouped according to their geography and time specific radio resource reservation requests, Flows of users may be grouped according to flow profiles where a flow profile includes but is not limited to the following: flow type, flow header contents, over-the-top service provider identity.

The disclosed invention proposes system architectures and methods for the service group based virtualization and load balancing of dual connectivity RAN. The proposed invention adopts a heterogeneous network architecture where macro and small cells coexist and collaborate to enhance network capacity, where the control and user planes are separated, and the control plane is served only by the macro cell base station. The invention assumes that the macro cell utilizes a frequency band which is non-overlapping with at least another frequency band which is shared by the small cells. The disclosed architectures and methods are applicable to either existing standards (such as LTE), technologies (such as Phantom Cell or Dual Connectivity) or any future standard or technology adopting a heterogeneous network architecture where the control and user planes are separated, and the control plane is served only by the macro cell base station. Hereafter, the term "dual connectivity" will be used generally for such present and future HetNet architectures where control plane is served only by the macro cell base station in a heterogeneous cellular network.

In the invention, the virtual medium access control layers (vMACs) for all existing service groups run on top of the physical mobile operator's medium access control layer. In a base station, one or more vMACs may be programmatically invoked, modified or terminated at a given time. Virtualizing the MAC layer into multiple distinct slices as vMACs provides the same semantics to each network operator or service provider controlling one or more such service groups as if they were the sole operator to conduct scheduling.

In state-of-the-art cellular wireless networks, the scheduler running on a base station decides on which users to serve at a given time, and maps the head-of-line packets of the scheduled user flows to wireless resource blocks (RBs) that are available. In the invention, there may exist multiple vMACs present on a base station. Each vMAC is allocated a portion of the wireless resources available at the base station and runs its own scheduler which is responsible from deciding which of its subscriber flows are to be served on its allocated portion of the wireless resources.

In the invention, it is assumed that the macro cell utilizes a frequency band which is non-overlapping with at least another frequency band which is shared by the small cells. A central RAN controller entity allocates the wireless resources, which may be any combination of time, frequency, transmission power, code, or antenna, to the base stations and the virtualized MAC slices of each base station. The control traffic of dual connectivity enabled UEs are always served by the macro cell base station. The data traffic of some dual connectivity enabled UEs can be served by both the macro cell base station and small cell base stations. The RAN controller performs the split of the data channel for such UEs between the macro and small cells such that a desired load balancing is achieved. The disclosed invention proposes methods to perform such allocation.

A number of related art to the presented invention are summarized above. The related art generally specifies systems and methods for the realization of dual connectivity technology. The disclosed invention presents system and methods for the service group based virtualization of the wireless resources and load balancing on a dual connectivity system, where the macro cell's frequency band is non-overlapping with the shared frequency band of small cells.

The invention is concerned with heterogeneous cellular networks (HetNets) consisting of a macro cell and one or more small cells with overlapping or partially overlapping service (coverage) areas with the service area of the macro cell. The architecture assumed by the invention is exemplified in FIG. 1A. In the figure, plurality of user equipments (UEs) such as (124), (125), (126), (127), (128), (129) exist. These UEs are served by the macro cell base station (BS) (101) and/or the small cell base stations (113), (114). The lighter shaded area (102) depicts the service area of the macro cell BS, whereas the darker shaded areas (115), (116) depict the service areas of the small cells. The service area (115) completely overlaps with the service area of the macro cell (102), whereas the service area (116) partially overlaps with it. The macro cell utilizes a frequency band which is non-overlapping with at least another frequency band which is shared by the small cells.

There may exist different service groups that the said UEs belong to. In the figure, as an example, UEs belonging to four service groups, which are depicted by using different icons for the UEs, exist. In the figure, the UE (124) belongs to one service group, UEs (125) and (128) belong to another service group, (126) and (129) belong to another service group, and the UE (127) belongs to yet another service group. It may also be the case that a UE may belong to more than one service group, or a UE may belong to different service groups at different times or locations. On the other hand, there may not be any distinction of the UEs based on the service groups, which is equivalent to all UEs belonging to the same service group. Thus, the invention's service group definition covers all of these cases.

The entity called the RAN controller (130) is concerned with the control plane of the radio access network. It's logically shown with the box (130) but may be physically realized in the core network, or somewhere else, such as the cloud. It may also be physically realized in a distributed fashion; however, its functionality is logically centralized. The dashed lines (171), (172), (173) represent the control communications between the RAN controller and the macro and small base stations.

The RAN controller has access to the service group attributes. The collection of attributes for a service group is called "group profile," and may consist of properties such as, and not limited to, the user equipments and base stations for which the profile is defined for, the RAN control algorithms (e.g., admission control, scheduling, handover, etc.) used for said service group, percentage of wireless resources allocated to said service group, the dual connectivity mode of the service group, etc. The RAN controller specifies network virtualization, i.e., allocation and isolation of the network resources, for the service groups at all BSs. The RAN controller also decides on the splitting ratios of data traffic between macro and small cell base stations for some UEs, such that a desired load balancing is achieved. Additionally, the RAN controller periodically collects information from the BSs and UEs such as link qualities, signal strength/quality indicators, instantaneous traffic loads and rates, etc.

The invention specifies system and methods for programmable virtualization and load balancing of split-channel heterogeneous networks utilizing the dual connectivity paradigm. The term "dual connectivity" is used in the invention to denote the assumed architecture explained herein, and is not limited to the dual connectivity technology in 3GPP specification, but implies any such present or future HetNet architecture where control and data planes are separate and control plane is served by the macro cell base station. As such, the group profile of each service group contains a "dual connectivity" attribute. The values that this attribute can take are "macro cell only," "small cell only," "dual connectivity enabled-A," and "dual connectivity enabled-B." In another embodiment, other definitions with equivalent meanings might be used for the attribute values. According to the service areas of the macro and small cells, some UEs might have only one possibility for this attribute. For example, the UE (126) can only be served by the small cell BS (114), thus, it belongs to a service group with the dual connectivity attribute being "small cell only." The UE (125) can only be served by the macro cell BS (101), thus, it belongs to a service group with the dual connectivity attribute being "macro cell only." On the other hand, the UEs (124), (127), (128) and (129) are within the service areas of both the small cell BS (113) and the macro cell BS (101). Thus they may belong to service groups with any dual connectivity attribute. As an example, the UE (127) belongs to a service group with the dual connectivity attribute being "dual connectivity enabled-A," the UE (124) belongs to a service group with the dual connectivity attribute being "dual connectivity enabled-B," the UE (128) belongs to a service group with the dual connectivity attribute being "macro cell only," the UE (129) belongs to a service group with the dual connectivity attribute being "small cell only."

In FIG. 1A, the solid lines denote the data communications. Data flows from the internet (151) or other networks (152) go through the core network (141). An example for such an entity can be the EPC of LTE, however the invention is not limited to any standard, and is also applicable to any similar architecture of future standards. From the core network, the flows arrive at a demultiplexer entity (142). This entity can be implemented as part of the core network. For each flow, according to the dual connectivity attribute of the service group of the UE that the said flow is destined to, the demultiplexer sends the incoming data packets to a macro or small cell base station. For example, for a "macro cell only" UE such as (125) or (128), all packets of the flows destined to said UE are sent to the macro base station (101). For a "small cell only" UE such as (129), all packets of the flows destined to said UE are sent to the small cell base station serving said UE (113). Similarly, all packets of the flows destined to UE (126) are sent to the small cell base station (114). For a UE that is "dual connectivity enabled-A" or "dual connectivity enabled-B" all packets of the flows destined to said UE are sent to either only to its serving small cell BS (113) or to both its serving small and macro cell BSs (113), (101). In the latter case, the configuration of the split of the flows is specified by the RAN controller, such that a desired load balancing is achieved. If more than one small cell is serving a UE (FIG. 2B), the data packets might be sent to multiple small cells. The load balancing between the small cells is also governed by the RAN controller in this case. The data connections (161) and (162) can be realized by the S1-U interface in the LTE architecture, or any other equivalent interfaces in other current or future technologies. The control connections (171), (172) and (173) can be realized by the S1-MME interface or by a newly defined interface in the LTE architecture, or any other equivalent interfaces in other current or future technologies.

In another embodiment, as shown in FIG. 1B, the control communications between the small cell base stations and the RAN controller is not direct, however, through the macro cell base station. In the figure, the RAN controller (131) communicates to small cell BS (117) through the control plane connections (174) and (175). As before, the connection (174) can be realized by the S1-MME interface or by a newly defined interface in the LTE architecture, or any other equivalent interfaces in other current or future technologies. The connection (175) can be realized by the X2-C interface or by a newly defined interface in the LTE architecture, or any other equivalent interfaces in other current or future technologies.

In another embodiment, as shown in FIG. 1C, the data communications between the core network (142) and the small cell base stations (118), (119) are done through the macro cell base station (102). In this case, the demultiplexer functionality is implemented within the macro cell base station. As before, the connection (163) can be realized by the S1-U interface in the LTE architecture, or any other equivalent interfaces in other current or future technologies. The connection (164) can be realized by the X2-U interface or by a newly defined interface in the LTE architecture, or any other equivalent interfaces in other current or future technologies.

In another embodiment, as shown in FIG. 1D, both the data and control communications to small cell base stations are done through the macro cell base station. As before, the connection (176) can be realized by the S1-MME interface or by a newly defined interface in the LTE architecture, or any other equivalent interfaces in other current or future technologies. The connection (177) can be realized by the X2-C interface or by a newly defined interface in the LTE architecture, or any other equivalent interfaces in other current or future technologies. The connection (165) can be realized by the S1-U interface in the LTE architecture, or any other equivalent interfaces in other current or future technologies. The connection (166) can be realized by the X2-U interface or by a newly defined interface in the LTE architecture, or any other equivalent interfaces in other current or future technologies.

FIG. 2A depicts the data and control communications between the base stations and the UEs.

Both the data and control planes of the UEs belonging to a "macro cell only" service group, such as (203), are served by the macro cell base station (201). This is shown by the connections (211) and (212). Both the data and control planes of the UEs belonging to a "small cell only" service group, such as (206), are served by its serving small cell base station (202). This is shown by the connections (218) and (219). The data packets of UEs that belong to a "dual connectivity enabled-A" service group, such as (204), are served by its serving small cell base station (202). This is shown by the connection (214). The control plane of the said UEs are served by the macro cell base station (201). This is shown by the connection (213). The data packets of UEs that belong to a "dual connectivity enabled-B" service group, such as (205), are served by both the macro cell base station (201) and its serving small cell base station (202). This is shown by the connections (216) and (217). The split of the data between the macro and small cells is governed by the RAN controller (130 in FIG. 1). The RAN controller calculates and sets the optimal splitting between the macro cell base station and the small cell base station dynamically, such that desired load balancing is achieved. The control plane of the UEs that belong to a "dual connectivity enabled-B" service group are served by the macro cell base station (201). This is shown by the connection (215).

In another embodiment, as shown in FIG. 2B, the data packets of "dual connectivity enabled-A" (222), "dual connectivity enabled-B" (223), and "small cell only" (224) UEs may be served by more than one small cell. These are shown by the connections (242), (243), (246), (247), (249), (250). The data split between the macro cell and the small cells are governed by the RAN controller (130 in FIG. 1). The RAN controller calculates and sets the optimal splitting between the macro cell base station and the small cell base stations dynamically, such that desired load balancing is achieved.

The RAN controller coordinates the wireless resource allocation to base stations and the load balancing as explained in FIG. 3. The wireless resources may be any combination of time, frequency, transmission power, code, or antenna. First, let us assume the following: flows labeled $m_1$ through $m_a$ are destined to UEs that belong to service profiles that are "macro cell only" (301). Flows labeled $d_1$ through $d_b$ are destined to UEs that belong to service profiles that are "dual connectivity enabled-A" (302). Flows labeled $e_1$ through $e_c$ are destined to UEs that belong to service profiles that are "dual connectivity enabled-B" (303). Flows labeled $s_1$ through $s_d$ are destined to UEs that belong to service profiles that are "small cell only" (304). These flows do not have to be actual flows as long as they are representative of the total amount of traffic that need to be delivered to the UEs. Some of these flows may represent only data traffic, some of them may represent only control traffic, and some of them may represent a combination of data and control traffic.

Assume that the wireless resources that are allocated to the "macro cell only" traffic are collectively $x_1$% of the total macro cell resources (311). Since the macro cell and small cells operate on different frequency bands, the macro cell resources are orthogonal to small cell resources. Therefore, $x_1$ may take any value between 0 and 100. The case when $x_1$ is less than 100 is possible, when some macro cell resources are not assigned. Such a choice might be due to, for example, the service level agreements between the physical network operator and the virtual network operators governing the service groups, or for any other reason.

Assume the wireless resources that are allocated to the "dual connectivity enabled-A" traffic are collectively $x_2$% of the total small cell resources (312), the wireless resources that are allocated to the "dual connectivity enabled-B" traffic are collectively $x_3$% of the total small cell resources (313), the wireless resources that are allocated to the "small cell only" traffic are collectively $x_4$% of the total small cell resources (314). Obviously, summation of $x_2$, $x_3$, and $x_4$ must be less than or equal to 100. The case when the sum is less than 100 is possible due to similar reasons listed above. In another embodiment, any of the $x_1$, $x_2$, $x_3$, and $x_4$ values may be zero, if no UEs exist belonging to the associated service group.

Assume that a fraction $c_a$ of the collective "dual connectivity enabled-A" traffic is control traffic and thus as fraction $(1-c_a)$ of the collective "dual connectivity enabled-A" traffic is data traffic. Similarly, assume that a fraction $c_b$ of the collective "dual connectivity enabled-B" traffic is control traffic and thus as fraction $(1-c_b)$ of the collective "dual connectivity enabled-B" traffic is data traffic. The numbers $c_a$ and $c_b$ are non-negative real numbers that are less than or equal to one. $c_a$ and $c_b$ values change over time and should be known in real time for each wireless resource allocation update (e.g., every 1 ms in LTE). If the RAN controller is physically realized close to the data path, such as close to the serving gateway of the core network, or with the demultiplexer entity, or with the macro base station, then this information is available to the RAN controller in real time. Otherwise, a low latency communication between the RAN controller and the demultiplexer entity or functionality is needed for the RAN controller to acquire this information in real time for each flow. Moreover, assume that a fraction p of the collective data traffic destined to "dual connectivity enabled-B" UEs is to be served by the macro cell BS. The p value is computed by the RAN controller at each resource allocation update to achieve the desired load balancing, and the resource allocation is done according to the computed optimal p value as explained next.

The amount of wireless resources used by the macro cell base station includes all the resources allocated to "macro cell only" flows, enough resources to be able to serve the control traffic of "dual connectivity enabled-A" and "dual connectivity enabled-B" flows, and resources to be able to serve the portion of the "dual connectivity enabled-B" data traffic assigned to be served by the macro cell. Thus, the macro cell uses y % of its resources, where y is given by $$y = x_1 + c_a x_2 + c_b x_3 + (1-c_b)px_3.$$

Similarly, the small cells use z % of their resources, while z is $$z = x_4 + (1-c_a)x_2 + (1-c_b)(1-p)x_3.$$

To achieve the load desired load balancing between the macro cell and the small cells, the RAN controller has the freedom to set the value of p to a desired level. In one embodiment, assume a target maximum macro cell resource usage level $y_{max}$ is specified. Then the p value should be set according to $$p = \begin{cases} 0, & \text{if } y_{max} < \alpha_1, \\ \dfrac{y_{max} - x_1 - c_a x_2 - c_b x_3}{(1-c_b)x_3}, & \text{if } \alpha_1 \leq y_{max} \leq \beta_1, \\ 1, & y_{max} > \beta_1, \end{cases}$$

where $\alpha_1 = x_1 + c_a x_2 + c_b x_3$ and $\beta_1 = x_1 + c_a x_2 + c_b x_3 + (1-c_b)x_3$. Above, in the first case when $y_{max} < \alpha_1$, even when all data traffic of "dual connectivity enabled-B" flows are served by the small cells, the desired macro cell utilization of $y_{max}$ has to be exceeded since "macro cell only" flows and control traffic of dual cell flows already exceed $y_{max}$. In order to make the actual utilization as close as possible to $y_{max}$, p is set to 0. In the second case, the desired maximum utilization $y_{max}$ is achieved exactly. In the third case when $y_{max} > \beta_1$, even when all "dual connectivity enabled-B" traffic is served by the macro cell, the actual utilization is below the desired maximum $y_{max}$.

In another embodiment, a target maximum small cell resource usage level $z_{max}$ is specified. Then the p value should be set according to $$p = \begin{cases} 1, & \text{if } z_{max} < \alpha_2, \\ 1 - \dfrac{z_{max} - x_4 - (1-c_a)x_2}{(1-c_b)x_3}, & \text{if } \alpha_2 \leq z_{max} \leq \beta_2, \\ 0, & y_{max} > \beta_2, \end{cases}$$

where $\alpha_2 = x_4 + (1-c_a)x_2$ and $\beta_2 = x_4 + (1-c_a)x_2 + c_b x_3 + (1-c_b)x_3$. Above, in the first case when $z_{max} < \alpha_2$, even when all data traffic of "dual connectivity enabled-B" flows are served by the macro cell, the desired macro cell utilization of $z_{max}$ has to be exceeded since "small cell only" flows and data traffic of "dual cell enabled-A" flows already exceed $z_{max}$. In order to make the actual utilization as close as possible to $z_{max}$, p is set to 1. In the second case, the desired maximum utilization $z_{max}$ is achieved exactly. In the third case when $z_{max} > \beta_2$, even when all "dual connectivity enabled-B" traffic is served by the small cells, the actual utilization is below the desired maximum $z_{max}$.

In another embodiment, the load balancing is performed such that, the macro cell base station load is a multiple γ of the small cell base station load:

$$y = \gamma z,$$

therefore $$x_1 + c_a x_2 + c_b x_3 + (1 - c_b) p x_3 = \gamma [x_4 + (1 - c_a) x_2 + (1 - c_b)(1 - p) x_3],$$

which implies $$p = \begin{cases} 0, & \text{if } \rho < 0, \\ \rho, & \text{if } 0 \le \rho \le 1, \\ 1, & \rho > 1, \end{cases} \text{ where}$$

$$\rho = \frac{\gamma x_4 - x_1 + (\gamma - \gamma c_a - c_a) x_2 + (\gamma - \gamma c_b - c_b) x_3}{(1 + \gamma)(1 - c_b) x_3}.$$

If γ is too low, the balancing of y=γz cannot be achieved since the "macro cell only" traffic and the control portion of dual connectivity traffic exceeds γz even when p=0. In order to minimize the difference, p=0 is chosen. This corresponds to ρ<0 case above. If γ is too high, the balancing of y=γz cannot be achieved since the "small cell only" traffic and the data portion of "dual connectivity-A" traffic exceeds y/γ even when p=1. In order to minimize the difference, p=1 is chosen. This corresponds to ρ>1 case above.

According to the optimal p values given above, the RAN controller configures the macro cell base station to use y % of its resources (321) and earmarks z % of the small cell resources to be used (322). These resources are further split by the RAN controller among small cells depending on which flow is served by which small cell and how much resources were allocated for the slice that the said flow belongs to (331), (332), (333). In another embodiment, if the UEs can be served by multiple small cell base stations (FIG. 2B), then further load balancing among the small cell base stations can be done in a manner similar to above. Then, each base station runs its own network virtualization procedure to further slice the resources that it was allocated to (341), (342), (343), (344), (345).

Many of the above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

CONCLUSION

A system and method has been shown in the above embodiments for the effective implementation of a system and method for programmable virtualization and load balancing of split-channel heterogeneous networks utilizing dual connectivity. While various preferred embodiments have been shown and described, it will be understood that there is no intent to limit the invention by such disclosure, but rather, it is intended to cover all modifications falling within the spirit and scope of the invention, as defined in the appended claims.

The invention claimed is:

1. A method for programmable virtualization and load balancing of split-channel heterogeneous networks utilizing a dual connectivity paradigm comprising:

a. assigning a dual connectivity attribute to a group profile of each service group, the dual connectivity attribute comprising any of the following: macro cell only, small cell only, dual connectivity enabled-A, and dual connectivity enabled-B;

b. serving both a data plane and a control plane of one or more user equipment belonging to a service group having the macro cell only attribute via a macro cell base station;

c. serving both a data plane and a control plane of one or more user equipment belonging to a service group having the small cell only attribute via a small cell base station;

d. serving data plane of one or more user equipment belonging to a service group having the dual connectivity enabled-A attribute via a small cell base station, and serving control plane of one or more user equipment belonging to the service group having the dual connectivity enabled-A attribute via a macro cell base station; and e. serving data plane of one or more user equipment belonging to a service group having the dual connectivity enabled-B attribute via both a macro cell base station and a small cell base station, and serving control plane of one or more user equipment belonging to the service group having the dual connectivity enabled-B attribute via a macro cell base station, and wherein splitting of virtually defined bandwidth of data plane between macro cell base stations and small cell base stations, and allocation of one or more wireless resources is governed by a Radio Access Network (RAN) controller, the RAN controller calculating and dynamically setting splitting of virtually defined bandwidth of data plane between macro cell base stations and small cell base stations in order to achieve a desired load balancing, under consideration of virtualized bandwidth of all profiles of all service groups, by mapping to physical bandwidth of macro cell base stations and small cell base stations, and wherein the macro cell base stations utilizes a common frequency band that is non-overlapping with at least another frequency band which is shared by the small cell base stations.

2. The method of claim 1, wherein the wireless resources comprise any of, or a combination of, the following: time, frequency, transmission power, code, or antenna.

3. The method of claim 2, wherein wireless resources that are allocated to traffic associated with the macro cell only attribute traffic are collectively $x_1$ % of total macro cell base station resources, wireless resources that are allocated to traffic associated with the dual connectivity enabled-A attribute are collectively $x_2$ % of total small cell base station resources, wireless resources that are allocated to traffic associated with the dual connectivity enabled-B attribute are collectively $x_3$ % of the total small cell base station resources, and wireless resources that are allocated to traffic associated with the small cell only attribute are collectively $x_4$ % of the total small cell base station resources, wherein the sum of $x_2$, $x_3$, and $x_4$ is less than or equal to 100.

4. The method of claim 3, wherein any one of $x_1$, $x_2$, $x_3$, or $x_4$ is zero, when no user equipment exists belonging to an associated service group.

5. The method of claim 3, wherein for the case when $x_1$ is less than 100, not all macro cell base station resources are utilized.

6. The method of claim 5, when a fraction ca of a collective traffic associated with the dual connectivity enabled-A attribute is control traffic and another fraction $(1-c_a)$ of the collective traffic associated with the dual connectivity enabled-A attribute is data traffic, and when a fraction $c_b$ of a collective traffic associated with the dual connectivity enabled-B attribute is control traffic and another fraction $(1-c_b)$ of the collective traffic associated with the dual connectivity enabled-B attribute is data traffic, wherein $c_a$ and $c_b$ are non-negative real numbers that are less than or equal to one, and where a fraction p is defined as a collective traffic destined to dual connectivity enabled-B UEs that are to be served by a macro cell BS, wherein the method further comprises the steps of:

a. computing utilization of a given macro cell base station as y % of its resources, where y is given by:

$$y = x_1 + c_a x_2 + c_b x_3 + (1-c_b)p x_3, \text{ and}$$

b. computing utilization of a given small cell base station as z % of its resources, where z is given by:

$$z = x_4 + (1-c_a)x_2 + (1-c_b)(1-p)x_3.$$

7. The method of claim 6, wherein in order to achieve the desired load balancing between macro cells and small cells, the RAN controller sets p to a desired level according to:

$$p = \begin{cases} 0, & \text{if } y_{max} < \alpha_1, \\ \dfrac{y_{max} - x_1 - c_a x_2 - c_b x_3}{(1 - c_b) x_3}, & \text{if } \alpha_1 \leq y_{max} \leq \beta_1, \\ 1, & y_{max} > \beta_1, \end{cases}$$

wherein $y_{max}$ is a target maximum macro cell resource usage level, $\alpha_1 = x_1 + c_a x_2 + c_b x_3$ and $\beta_1 = x_1 + c_a x_2 + C_b X_3 + (1-c_b)x_3$.

8. The method of claim 6, wherein in order to achieve the desired load balancing between macro cells and small cells, the RAN controller sets p to a desired level according to:

$$p = \begin{cases} 1, & \text{if } z_{max} < \alpha_2, \\ 1 - \dfrac{z_{max} - x_4 - (1 - c_a)x_2}{(1 - c_b) x_3}, & \text{if } \alpha_2 \leq z_{max} \leq \beta_2, \\ 0, & y_{max} > \beta_2, \end{cases}$$

wherein $z_{max}$ is a target maximum macro cell resource usage level, $\alpha_2 = x_4 + (1-c_a)x_2$ and $\beta_2 = x_4 + (1-c_a)x_2 + c_b x_3 + (1-c_b)x_3$.

9. The method of claim 6, wherein in order to achieve the desired load balancing between macro cells and small cells, the RAN controller sets p to a desired level according to:

$$p = \begin{cases} 0, & \text{if } \rho < 0, \\ \rho, & \text{if } 0 \leq \rho \leq 1, \text{ wherein} \\ 1, & \rho > 1, \end{cases}$$

$$\rho = \frac{\gamma x_4 - x_1 + (\gamma - \gamma c_a - c_a)x_2 + (\gamma - \gamma c_b - c_b)x_3}{(1 + \gamma)(1 - c_b)x_3}.$$

10. The method of claim 5, wherein a choice due to service level agreements between a physical network operator and virtual network operators governing one or more service groups results in not all macro cell base station resources being utilized.

11. An article of manufacture comprising non-transitory computer storage medium storing computer readable program code which, when executed by a processor implements a method for programmable virtualization and load balancing of split-channel heterogeneous networks utilizing a dual connectivity paradigm, the computer storage medium comprising:

a. computer readable program code assigning a dual connectivity attribute to a group profile of each service group, the dual connectivity attribute comprising any of the following: macro cell only, small cell only, dual connectivity enabled-A, and dual connectivity enabled-B;

b. computer readable program code serving both a data plane and a control plane of one or more user equipment belonging to a service group having the macro cell only attribute via a macro cell base station;

c. computer readable program code serving both a data plane and a control plane of one or more user equipment belonging to a service group having the small cell only attribute via a small cell base station;

d. computer readable program code serving data plane of one or more user equipment belonging to a service group having the dual connectivity enabled-A attribute via a small cell base station, and serving control plane of one or more user equipment belonging to the service group having the dual connectivity enabled-A attribute via a macro cell base station; and e. computer readable program code serving data plane of one or more user equipment belonging to a service group having the dual connectivity enabled-B attribute via both a macro cell base station and a small cell base station, and serving control plane of one or more user equipment belonging to the service group having the dual connectivity enabled-B attribute via a macro cell base station, and wherein splitting of virtually defined bandwidth of data plane between macro cell base stations and small cell base stations, and allocation of one or more wireless resources is governed by a Radio Access Network (RAN) controller, the RAN controller calculating and dynamically setting splitting of virtually defined bandwidth of data plane between macro cell base stations and small cell base stations in order to achieve a desired load balancing, under consideration of virtualized bandwidth of all profiles of all service groups, by mapping to physical bandwidth of macro cell base stations and small cell base stations, and wherein the macro cell base stations utilizes a common frequency band that is non-overlapping with at least another frequency band which is shared by the small cell base stations.

12. The article of manufacture of claim 11, wherein the wireless resources comprise any of, or a combination of, the following: time, frequency, transmission power, code, or antenna.

13. The article of manufacture of claim 12, wherein wireless resources that are allocated to traffic associated with the macro cell only attribute traffic are collectively $x_1$ % of total macro cell base station resources, wireless resources that are allocated to traffic associated with the dual connectivity enabled-A attribute are collectively $x_2$ % of total small cell base station resources, wireless resources that are allocated to traffic associated with the dual connectivity enabled-B attribute are collectively $x_3$ % of the total small cell base station resources, and wireless resources that are allocated to traffic associated with the small cell only attribute are collectively $x_4$ % of the total small cell base station resources, wherein the sum of $x_2$, $x_3$, and $x_4$ is less than or equal to 100.

14. The article of manufacture of claim 13, wherein any one of $x_1$, $x_2$, $x_3$, or $x_4$ is zero, when no user equipment exists belonging to an associated service group.

15. The article of manufacture of claim 13, when a fraction $c_a$ of a collective traffic associated with the dual connectivity enabled-A attribute is control traffic and another fraction $(1-c_a)$ of the collective traffic associated with the dual connectivity enabled-A attribute is data traffic, and when a fraction $c_b$ of a collective traffic associated with the dual connectivity enabled-B attribute is control traffic and another fraction $(1-c_b)$ of the collective traffic associated with the dual connectivity enabled-B attribute is data traffic, wherein $c_a$ and $c_b$ are non-negative real numbers that are less than or equal to one, and where a fraction p is defined as a collective traffic destined to dual connectivity enabled-B UEs that are to be served by a macro cell BS, wherein the method further comprises the steps of:

f. computer readable program code computing utilization of a given macro cell base station as y % of its resources, where y is given by:

$y = x_1 + c_a x_2 + c_b x_3 + (1-c_b)p x_3$, and g. computer readable program code computing utilization of a given small cell base station as z % of its resources, where z is given by:

$z = x_4 + (1-c_a)x_2 + (1-c_b)(1-p)x_3$.

16. The article of manufacture of claim 15, wherein in order to achieve the desired load balancing between macro cells and small cells, the RAN controller sets p to a desired level according to:

$$p = \begin{cases} 0, & \text{if } y_{max} < \alpha_1, \\ \frac{y_{max} - x_1 - c_a x_2 - c_b x_3}{(1-c_b)x_3}, & \text{if } \alpha_1 \leq y_{max} \leq \beta_1, \\ 1, & y_{max} > \beta_1, \end{cases}$$

wherein $y_{max}$ is a target maximum macro cell resource usage level, $\alpha_1 = x_1 + c_a x_2 + c_b x_3$ and $\beta_1 = x_1 + c_a x_2 c_b x_3 + (1-c_b)x_3$.

17. The article of manufacture of claim 15, wherein in order to achieve the desired load balancing between macro cells and small cells, the RAN controller sets p to a desired level according to:

$$p = \begin{cases} 1, & \text{if } z_{max} < \alpha_2, \\ 1 - \frac{z_{max} - x_4 - (1-c_a)x_2}{(1-c_b)x_3}, & \text{if } \alpha_2 \leq z_{max} \leq \beta_2, \\ 0, & y_{max} > \beta_2, \end{cases}$$

wherein $z_{max}$ is a target maximum macro cell resource usage level, $\alpha_2 = x_4 + (1-c_a)x_2$ and $\beta_2 = x_4 + (1-c_a)x_2 + c_b x_3 + (1-c_b)x_3$.

18. The article of manufacture of claim 15, wherein in order to achieve the desired load balancing between macro cells and small cells, the RAN controller sets p to a desired level according to:

$$p = \begin{cases} 0, & \text{if } \rho < 0, \\ \rho, & \text{if } 0 \leq \rho \leq 1, \\ 1, & \rho > 1, \end{cases}$$

wherein macro cell base station load is a multiple γ of small cell base station load, and $$\rho = \frac{\gamma x_4 - x_1 + (\gamma - \gamma c_a - c_a)x_2 + (\gamma - \gamma c_b - c_b)x_3}{(1+\gamma)(1-c_b)x_3}.$$

19. The article of manufacture of claim 13, wherein for the case when $x_1$ is less than 100, not all macro cell base station resources are utilized.

20. The article of manufacture of claim 19, wherein a choice due to service level agreements between a physical network operator and virtual network operators governing one or more service groups results in not all macro cell base station resources being utilized.

* * * * *